US009958756B2

(12) United States Patent
Hu et al.

(10) Patent No.: US 9,958,756 B2
(45) Date of Patent: May 1, 2018

(54) CAMERA MODULE AND IMAGE CAPTURING UNIT THEREOF

(71) Applicant: TDK TAIWAN CORP., Yangmei Taoyuan (TW)

(72) Inventors: Chao-Chang Hu, Yangmei Taoyuan (TW); Bing-Ru Song, Yangmei Taoyuan (TW); Shu-Shan Chen, Yangmei Taoyuan (TW)

(73) Assignee: TDK Taiwan Corp., Yangmei Taoyuan (TW)

( * ) Notice: Subject to any disclaimer, the term of this patent is extended or adjusted under 35 U.S.C. 154(b) by 0 days. days.

(21) Appl. No.: 15/588,019

(22) Filed: May 5, 2017

(65) Prior Publication Data

US 2017/0336699 A1     Nov. 23, 2017

Related U.S. Application Data

(60) Provisional application No. 62/339,496, filed on May 20, 2016, provisional application No. 62/357,557, filed on Jul. 1, 2016.

(30) Foreign Application Priority Data

Apr. 19, 2017   (TW) .............................. 106113051 A

(51) Int. Cl.
```
G03B 13/36      (2006.01)
G02B 7/09       (2006.01)
G02B 27/64      (2006.01)
G03B 5/00       (2006.01)
```

(52) U.S. Cl.
CPC ............... *G03B 13/36* (2013.01); *G02B 7/09* (2013.01); *G02B 27/646* (2013.01); *G03B 5/00* (2013.01); *G03B 2205/0015* (2013.01); *G03B 2205/0069* (2013.01)

(58) Field of Classification Search
None
See application file for complete search history.

(56) References Cited

U.S. PATENT DOCUMENTS

| 2013/0107068 A1* | 5/2013 | Kim ..................... G03B 5/00 348/208.11 |
| 2015/0055220 A1* | 2/2015 | Lim ..................... G02B 7/022 359/557 |
| 2015/0103195 A1* | 4/2015 | Kwon .................. H04N 5/2253 348/208.12 |

(Continued)

OTHER PUBLICATIONS

U.S. Appl. No. 15/499,428, filed Apr. 27, 2017.

(Continued)

*Primary Examiner* — WB Perkey
(74) *Attorney, Agent, or Firm* — Muncy, Geissler, Olds & Lowe, P.C.

(57) ABSTRACT

An image capturing unit is provided, including a base, a frame movably connected to the base, a lens holder movably disposed in the frame for receiving a lens, a first magnet, a first coil, a second magnet, and a second coil. When a current is applied to the first coil, a magnetic force is generated between the first magnet and the first coil to move the frame and the lens holder relative to the base. When a current is applied to the second coil, a magnetic force is generated between the second magnet and the second coil to move the lens holder relative to the frame.

20 Claims, 9 Drawing Sheets

(56) References Cited

U.S. PATENT DOCUMENTS

| | | | | |
|---|---|---|---|---|
| 2015/0256727 | A1* | 9/2015 | Kim | G02B 7/09 |
| | | | | 348/208.12 |
| 2016/0085086 | A1* | 3/2016 | Rho | G02B 27/646 |
| | | | | 348/208.99 |
| 2016/0154204 | A1* | 6/2016 | Lim | G02B 7/08 |
| | | | | 359/557 |
| 2016/0252746 | A1* | 9/2016 | Kim | G02B 27/646 |
| | | | | 359/557 |
| 2017/0038600 | A1* | 2/2017 | Hee | G02B 27/646 |
| 2017/0045753 | A1* | 2/2017 | Enta | G02B 7/04 |
| 2017/0082823 | A1* | 3/2017 | Hwang | G02B 7/021 |
| 2017/0094187 | A1* | 3/2017 | Sharma | G02B 7/09 |
| 2017/0160558 | A1* | 6/2017 | Kim | G02B 27/646 |
| 2017/0171440 | A1* | 6/2017 | Park | H04N 5/2253 |
| 2017/0254979 | A1* | 9/2017 | Bai | G02B 7/10 |
| 2017/0315376 | A1* | 11/2017 | Hu | G02B 27/646 |
| 2017/0315377 | A1* | 11/2017 | Park | H04N 5/2257 |
| 2017/0336699 | A1* | 11/2017 | Hu | G02B 7/09 |
| 2017/0343832 | A1* | 11/2017 | Yeo | H04N 5/2253 |

OTHER PUBLICATIONS

U.S. Appl. No. 15/589,198, filed May 8, 2017.
U.S. Appl. No. 15/635,964, filed Jun. 28, 2017.
U.S. Appl. No. 15/639,793, filed Jun. 30, 2017.

* cited by examiner

CAMERA MODULE AND IMAGE CAPTURING UNIT THEREOF

CROSS REFERENCE TO RELATED APPLICATIONS

This Application claims priority claims priority of provisional U.S. Patent Application Ser. No. 62/339,496 filed on May 20, 2016, provisional U.S. Patent Application Ser. No. 62/357,557 filed on Jul. 1, 2016, and Taiwan Patent Application No. 106113051 filed on Apr. 19, 2017, the entirety of which is incorporated by reference herein.

BACKGROUND OF THE DISCLOSURE

Field of the Invention

The present invention relates to a camera module, and more particularly to a camera module with magnetic elements disposed therein.

Description of the Related Art

A conventional dual camera module usually has two image capturing units for capturing different images. However, as the image capturing units are close to each other, magnetic interference may occur between the magnets which are disposed in the lens driving mechanisms of the image capturing units, so that the focusing speed and accuracy of the lens which is moved along with a lens holder can be adversely reduced. Additionally, magnetic interference may also occur between a magnet and other components within the same image capturing unit. Thus, to design a camera module to reduce magnetic interference between magnetic elements has become an important issue.

BRIEF SUMMARY OF THE DISCLOSURE

Accordingly, one objective of the present invention is to provide an image capturing unit, including a base, a frame movably connected to the base, a lens holder movably disposed in the frame for receiving a lens, a first magnet disposed on the base, a first coil disposed on the frame, a second magnet disposed on the frame, and a second coil disposed on the lens holder. When a first current is applied to the first coil, a first magnetic force is generated between the first magnet and the first coil to move the frame and the lens holder relative to the base. When a second current is applied to the second coil, a second magnetic force is generated between the second magnet and the second coil to move the lens holder relative to the frame.

According to some embodiments of the disclosure, when the first current is applied to the first coil, the frame and the lens holder moves relative to the base along a first direction perpendicular to an optical axis of the lens.

According to some embodiments of the disclosure, when the second current is applied to the second coil, the lens holder moves relative to the frame along a second direction perpendicular to the first direction.

According to some embodiments of the disclosure, the image capturing unit further comprises a third magnet disposed on the frame and a third coil disposed on the base, wherein when a third current is applied to the third coil, a third magnetic force is generated between the third magnet and the third coil to move the frame and the lens holder relative to the base.

According to some embodiments of the disclosure, the first coil and the third magnet respectively have a bottom surface corresponding to the first magnet and the third coil, and the bottom surfaces of the first coil and the third magnet are aligned with each other.

According to some embodiments of the disclosure, the first magnet and the third coil respectively have a top surface corresponding to the first coil and the third magnet, and the top surfaces of the first magnet and the third coil are aligned with each other.

According to some embodiments of the disclosure, the image capturing unit further comprises a driving board with the third coil affixed thereto, wherein the driving board has a C-shaped structure, and the first magnet is located at an opening of the C-shaped structure.

According to some embodiments of the disclosure, the image capturing unit further comprises a third magnet disposed on the base and a third coil disposed on the frame, wherein when a third current is applied to the third coil, a third magnetic force is generated between the third magnet and the third coil to move the frame and the lens holder relative to the base.

According to some embodiments of the disclosure, when viewed along a direction perpendicular to an optical axis of the lens, the first coil and the second magnet at least partially overlap.

According to some embodiments of the disclosure, at least one of the first and second magnets is a multi-polar magnet.

Another objective of the present invention is to provide a camera module, including two aforementioned image capturing units, wherein the first magnets and the first coils of the two image capturing units are disposed on two adjacent sides between the two image capturing units.

According to some embodiments of the disclosure, the first magnets of the two image capturing units are integrally formed in one piece.

According to some embodiments of the disclosure, the first magnets of the two image capturing units are integrally formed in one piece as a 6-pole magnet.

According to some embodiments of the disclosure, the bases of the two image capturing units are integrally formed in one piece.

Another objective of the present invention is to provide a camera module, including the aforementioned image capturing unit and a camera unit arranged along a longitudinal direction, wherein the first magnet and the first coil are disposed on a side of the image capturing unit which is adjacent to the camera unit.

BRIEF DESCRIPTION OF THE DRAWINGS

For a more complete understanding of the embodiments, and the advantages thereof, reference is now made to the following descriptions taken in conjunction with the accompanying drawings.

DETAILED DESCRIPTION OF THE ILLUSTRATIVE EMBODIMENTS

While the invention has been described in connection with various aspects, it will be understood that the invention is capable of further modifications. This application is intended to cover any variations, uses or adaptation of the invention following, in general, the principles of the invention, including such departures from the present disclosure as come within the known and customary practice within the art to which the invention pertains.

In the following detailed description of the preferred embodiments, reference is made to the accompanying drawings, and in which specific embodiments of which the invention may be practiced are shown by way of illustration. In this regard, directional terminology, such as "top," "bottom," "front," "back," etc., is used with reference to the orientation of the figures being described. The components of the present invention can be positioned in a number of different orientations. As such, the directional terminology is used for the purposes of illustration and is in no way limiting.

Figure 1:
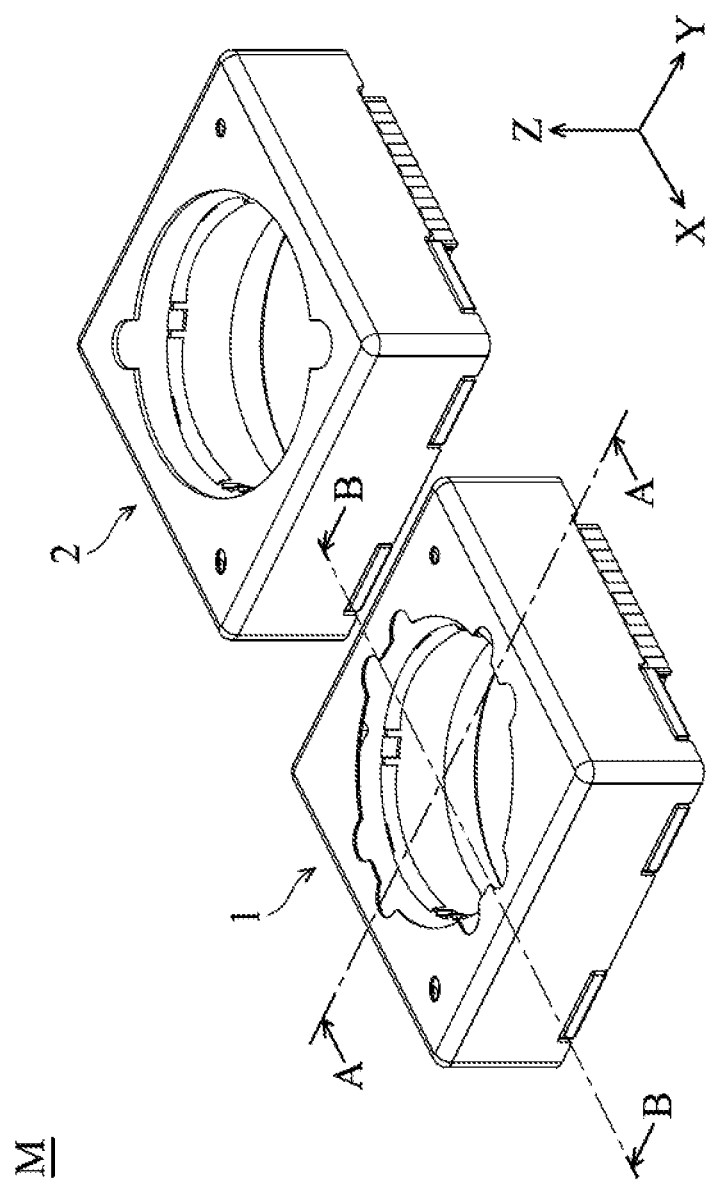
FIG. 1 shows a perspective diagram of a camera module, in accordance with an embodiment of the invention.
Figure 2:
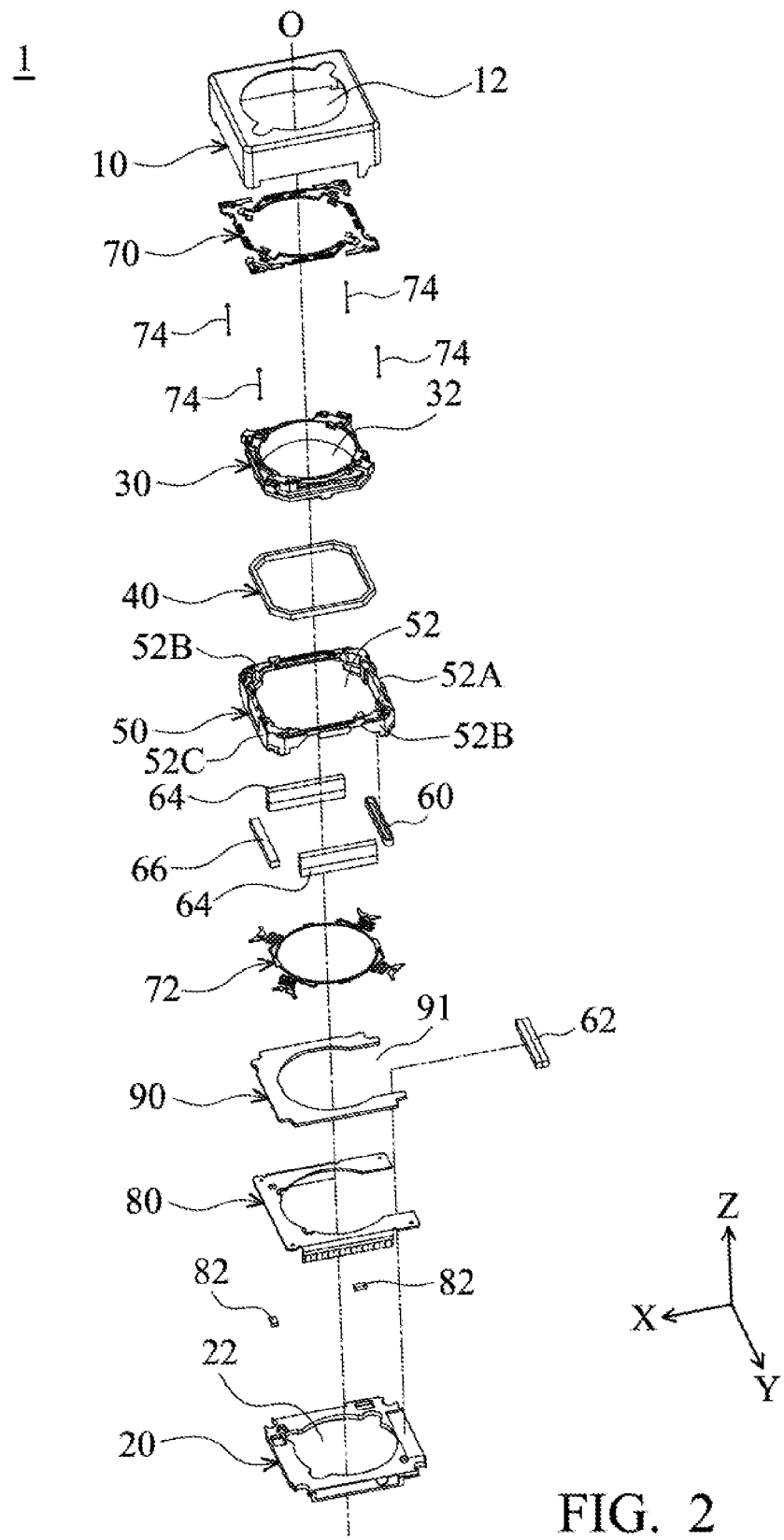
FIG. 2 shows an exploded diagram of the image capturing unit 1 in FIG. 1.
Figure 3:
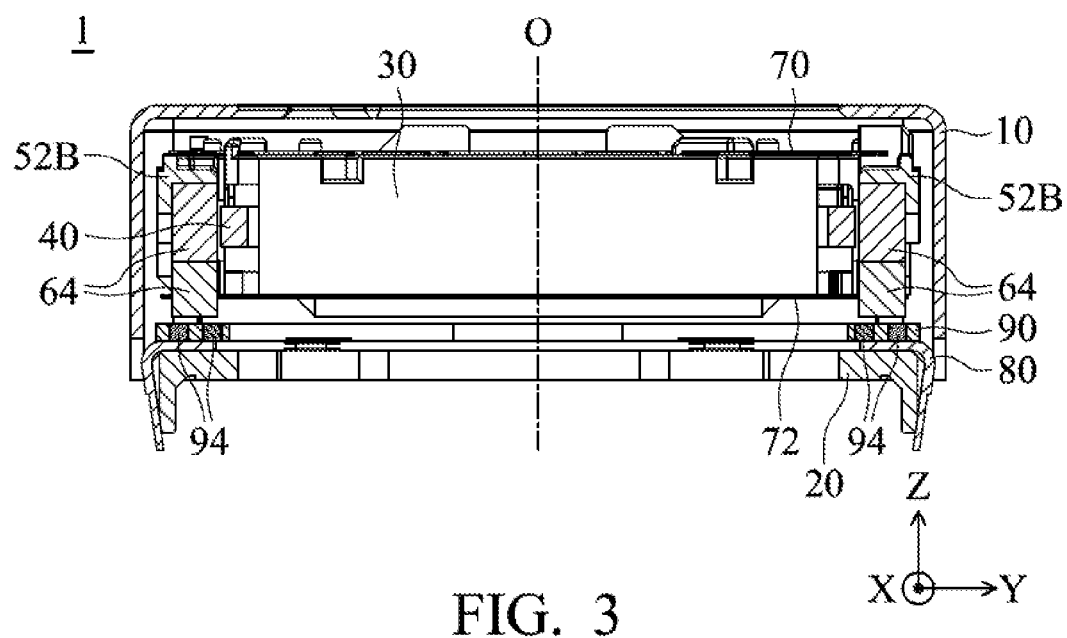
FIGS. 3 and 4 show cross-sectional views along lines A-A and B-B in FIG. 1.
Figure 4:
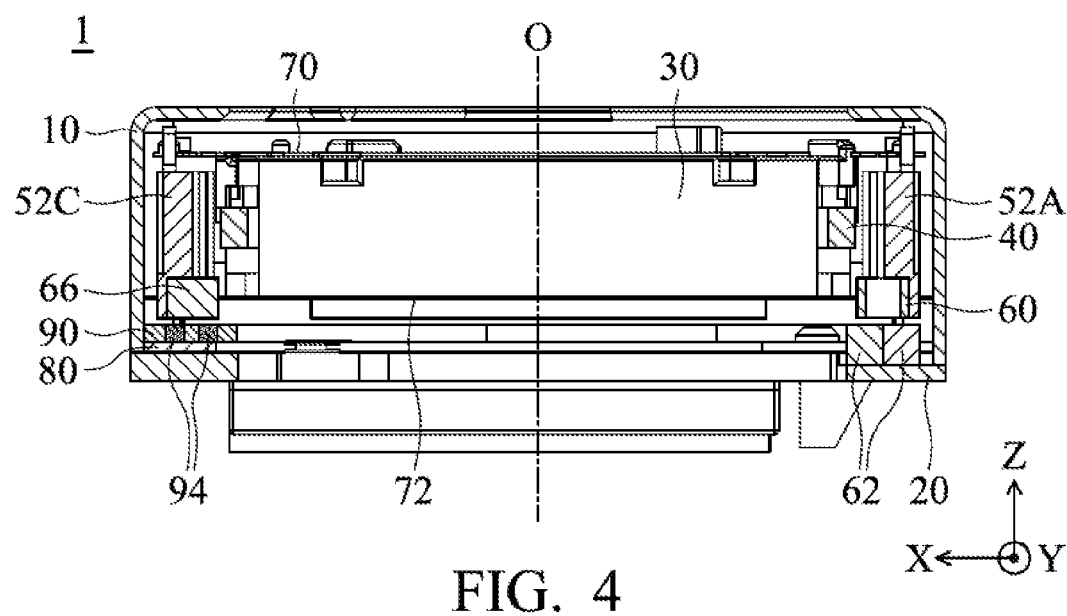

Referring to FIG. 1, a camera module M according to an embodiment of the invention includes two image capturing units 1 and 2 which may comprise the same or similar configuration and are arranged along a longitudinal direction (X axis). The camera module M can be disposed in a hand-held electronic device such as digital camera, cell phone, or tablet computer for photographing or video recording. FIG. 2 shows an exploded diagram of the image capturing unit 1 in FIG. 1, FIG. 3 shows a cross-sectional view along line A-A in FIG. 1, and FIG. 4 shows a cross-sectional view along line B-B in FIG. 1. As shown in FIG. 2, the image capturing unit 1 primarily comprises a housing 10, a base 20, a lens holder 30, a first coil 60, a second coil 40. A frame 50, a first magnet 62, at least a second magnet 64, a third magnet 66, an upper spring sheet 70, a lower spring sheet 72, a plurality of flexible members 74, a circuit board 80, a plurality of magnetic sensor 82, and a driving board 90.

The housing 10 is connected to the base 20 for receiving the other components of the image capturing unit 1. An optical lens (not shown) is received in the lens holder 30, and an image sensor (not shown) such as Charge-coupled Device (CCD) is disposed below the base 20, wherein light propagates through the lens and can be focused onto the image sensor along an optical axis O of the lens. As shown in FIG. 2, the housing 10 and the base 20 respectively form an opening 12 and an opening 22, wherein light can enter the image capturing unit 1 via the opening 12 and propagate sequentially through the lens and the opening 22 to the image sensor.

In this embodiment, the lens is affixed in a through hole 32 of the lens holder 30, and the second coil 40 is disposed around the lens holder 30. The lens holder 30 and the lens are movably connected to the frame 50 via the upper and lower spring sheets 70 and 72, so that the lens holder 30 and the lens are suspended within the frame 50 and are movable along the Z axis.

As shown in FIG. 2, the driving board 90 forms a C-shaped structure, and it can be affixed to the circuit board 80 by adhesive. In this embodiment, the circuit board 80 and the driving board 90 are electrically connected to each other. The first magnet 62 is disposed on the base 20 and accommodated in an opening 91 of the driving board 90. Referring to FIGS. 2-4, the first coil 60 is affixed to a sidewall 52A of the frame 50 parallel to the Y axis, corresponding to the first magnet 62. Two second magnets 64 are affixed to two sidewalls 52B of the frame 50 parallel to the X axis, corresponding to the second coil 40 and two third coils 94 (FIG. 3) which are disposed in the driving board 90. Additionally, the third magnet 66 is affixed to another sidewall 52C of the frame 50 parallel to the Y axis, corresponding to another third coil 94 (FIG. 4) which is disposed in the driving board 90.

Based on the mechanism as described above, when a current is applied to the second coil 40, a magnetic force is generated between the second coil 40 and the second magnets 64 which are affixed to the frame 50, so that the lens holder 30 and the lens can be moved relative to the frame 50 along a direction parallel to an optical axis O of the lens (Z direction), and auto focusing (AF) between the lens and the image sensor can therefore be achieved. It should be noted that the four flexible members 74 may be resilient metal wires which connect the frame 50 to the base 20, and the frame 50, the lens holder 30 and the lens are movably supported above the base 20 by the flexible members 74. Here, the circuit board 80 can be a C-shaped flexible printed circuit board, affixed to the base 20 by adhesive and electrically connect the flexible members 74 to an external control unit (not shown) which is located outside of the image capturing unit 1. The control unit can apply an electrical current through the circuit board 80 and the flexible members 74 to the second coil 40, so that a magnetic force can be generated between the second coil 40 and the second magnets 64 to move the lens holder 30 and the lens relative to the frame 50 along a direction parallel to the optical axis O of the lens (Z direction).

When the frame 50 encounters an impact from an external force, the lens may deviate relative to the base 20 in a horizontal direction (parallel to the XY plane). In this circumstance, the magnetic sensor 82 on the base can detect the horizontal displacement of the frame 50 relative to the base 20, and then the first and third coils 60 and 94 disposed on the frame 50 and the driving board 90 can be energized by electrical current to produce magnetic forces between the first, second, third magnets 62, 64, 66 and the first and third coils 60 and 94. Thus, the frame 50, the lens holder 30 and the lens can return to an initial position to achieve optical image stabilization (OIS) of the camera module. In some embodiments, the magnetic sensor 82 can be a Hall effect sensor, a magnetoresistive (MR) sensor, or a Fluxgate sensor.

Figure 5:
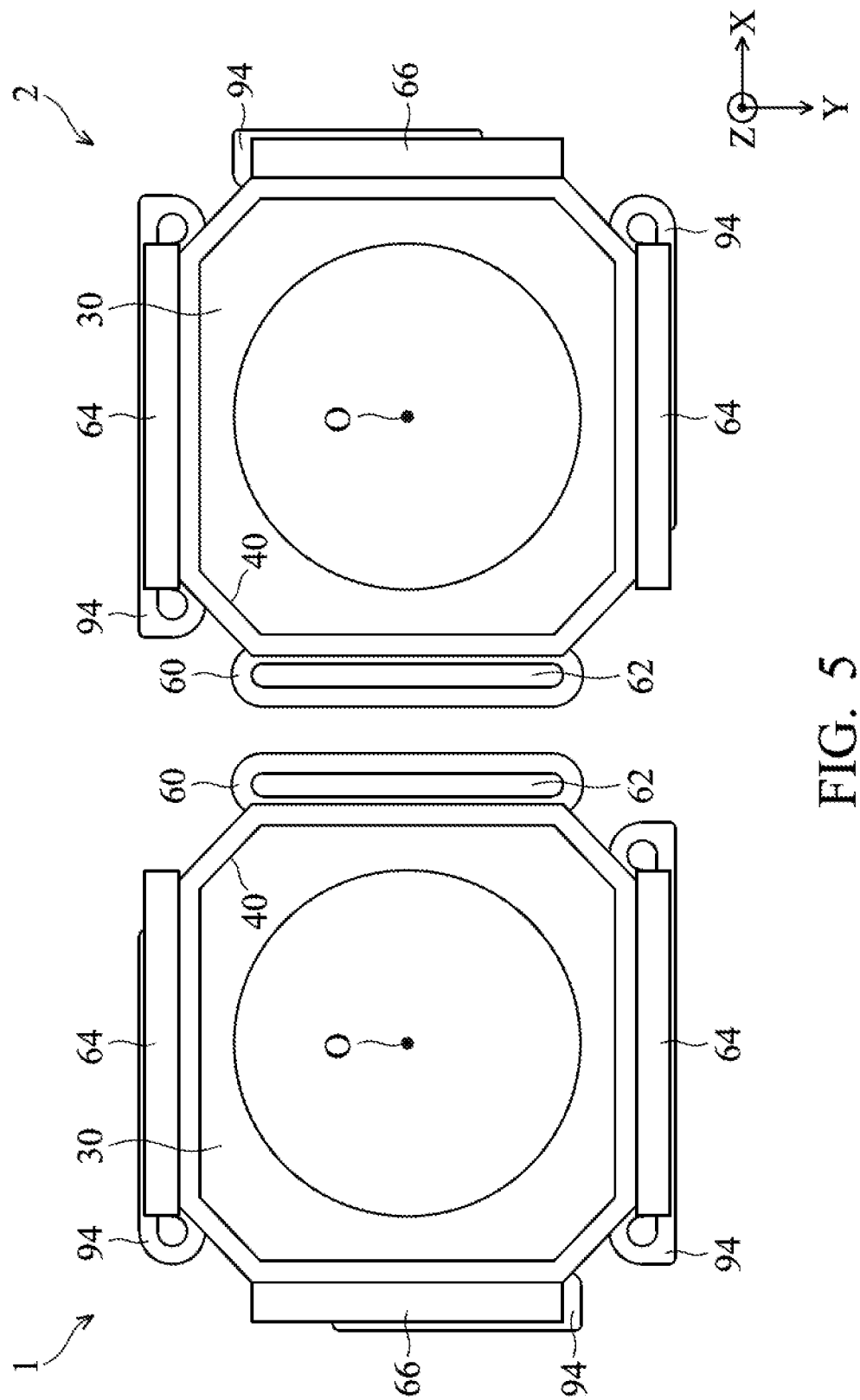
FIG. 5 shows a top view illustrating relative positions of the magnets, the coils, and the lens holders of the image capturing units 1 and 2, in accordance with an embodiment of the invention.
Figure 6:
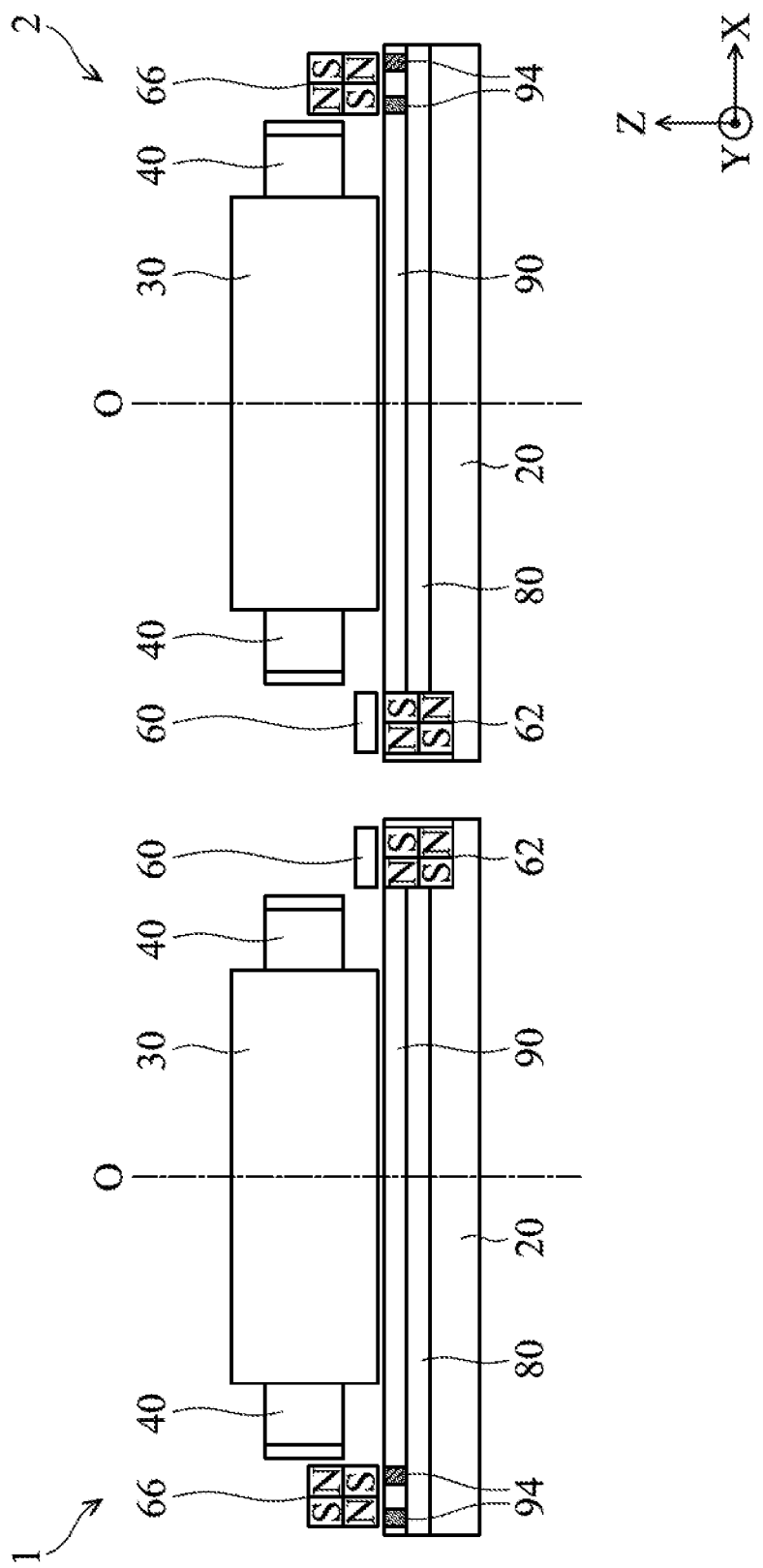
FIG. 6 shows a side view illustrating relative positions of the magnets, the coils, the lens holders, and the driving board of the image capturing units 1 and 2, in accordance with an embodiment of the invention.

Referring to FIGS. 1, 5, and 6, the magnets and coils in the other image capturing unit 2 may have the same or similar arrangement as the image capturing unit 1. As shown in FIGS. 5 and 6, the first coils 60 and first magnets 62 are disposed on adjacent sides between the image capturing units 1 and 2. Since the two first magnets 62 are both affixed to the base 20 below the first coils 60, relative movement between the two first magnets 62 is prohibited, so that magnetic interference between the two first magnets 62 due to excessive short distance therebetween can be efficiently prevented.

In this embodiment, the first coil 60 and the third magnet 66 respectively have a bottom surface facing the first magnet 62 and the third coil 94, wherein the bottom surfaces of the first coil 60 and the third magnet 66 are aligned with each other and have the same height along the Z direction. Similarly, the first magnet 62 and the third coil 94 respectively have a top surface facing the first coil 60 and the third magnet 66, wherein the top surfaces of the first magnet 62 and the third coil 94 are aligned with each other and have the same height along the Z direction. When viewed along a direction perpendicular to an optical axis O of the lens (parallel to the XY plane), the first coil 60 and the second magnet 64 at least partially overlap. That is, the first coil 60 and the second magnet 64 are substantially situated at the same height along the Z axis.

Figure 7:
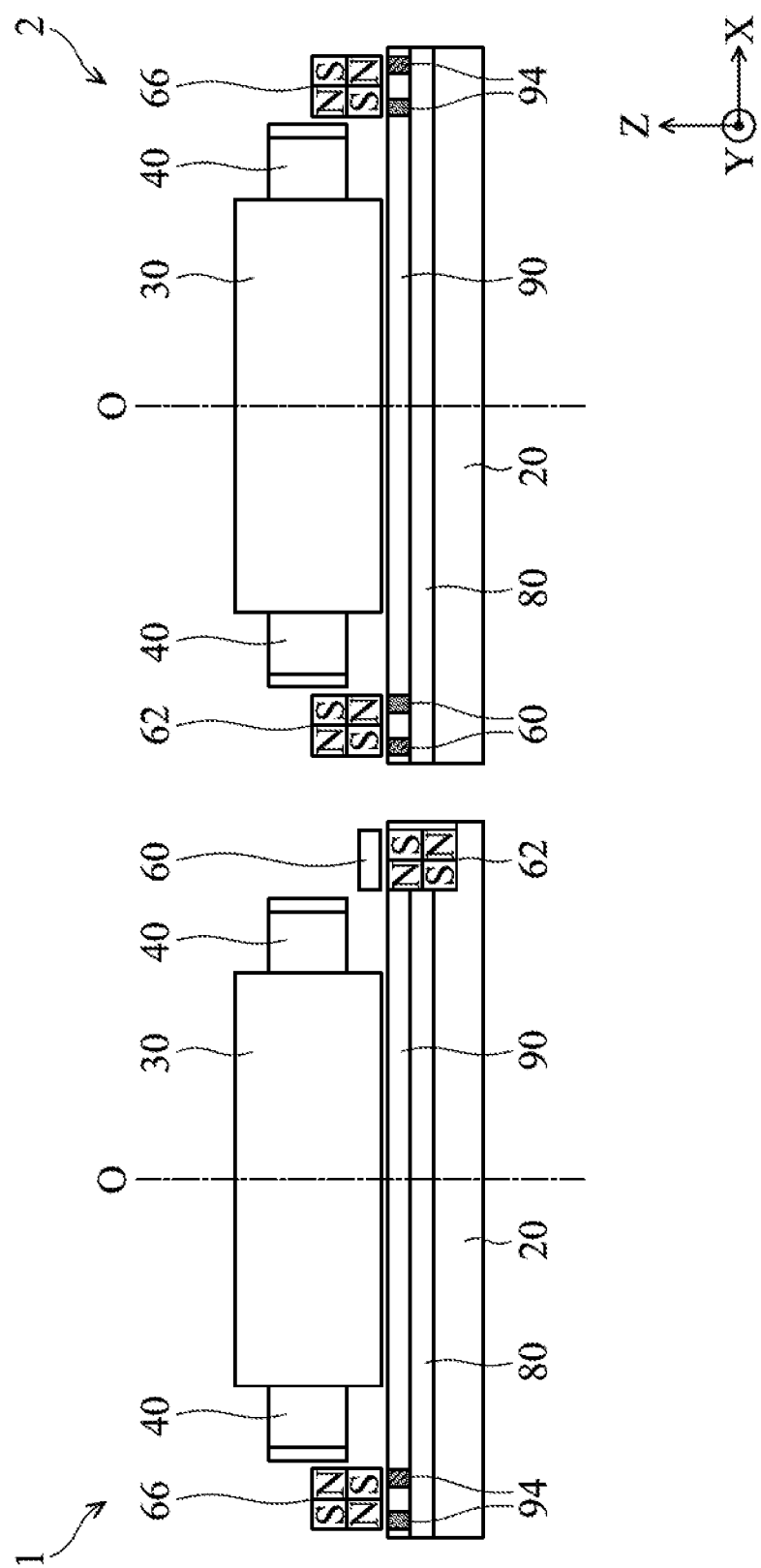
FIG. 7 shows a side view illustrating relative positions of the magnets, the coils, the lens holders, and the driving board of the image capturing units 1 and 2, in accordance with another embodiment of the invention.

According to another embodiment as shown in FIG. 7, the first magnet 62 in the image capturing unit 1 is disposed below the first coil 60, and the first magnet 62 in the image capturing unit 2 is disposed above the first coil 60 and may be mounted to the frame 50. Here, the first and third coils 60 and 94 are embedded in the driving board 90, so that the distance between the two first magnets 62 can be increased and magnetic interference therebetween can be efficiently reduced. It should be noted that any one of the first, second, and third magnets 62, 64, and 66 can be a multipolar magnet, such as the 4-pole magnet shown in FIGS. 6 and 7. As a result, not only can the dimensions of the camera module and the production cost be reduced, magnetic interference between the magnets can be further suppressed, but also the electromagnetic driving force can be increased, thereby facilitating miniaturization and high performance of the camera module.

As described above, when the first coil 60 is energized by electrical current, a magnetic force is produced between the first magnet 62 and the first coil 60, so that the frame 50, the lens holder 30 and the lens can move relative to the base 20 along a direction (first direction) parallel to the XY plane to achieve optical image stabilization (OIS) of the camera module. Similarly, when the third coil 94 is energized by electrical current, a magnetic force is produced between the third coil 94 and the third magnet 66, so that the frame 50, the lens holder 30 and the lens can move relative to the base 20 along a direction (first direction) parallel to the XY plane to achieve optical image stabilization (OIS) of the camera module. Moreover, when the second coil 40 is be energized by electrical current, magnetic forces are produced between the second coil 40 and the second magnets 64, so that the lens holder 30 and the lens can move relative to the frame 50 along a direction (second direction) parallel to the optical axis O to achieve auto focusing (AF) of the camera module.

Figure 8:
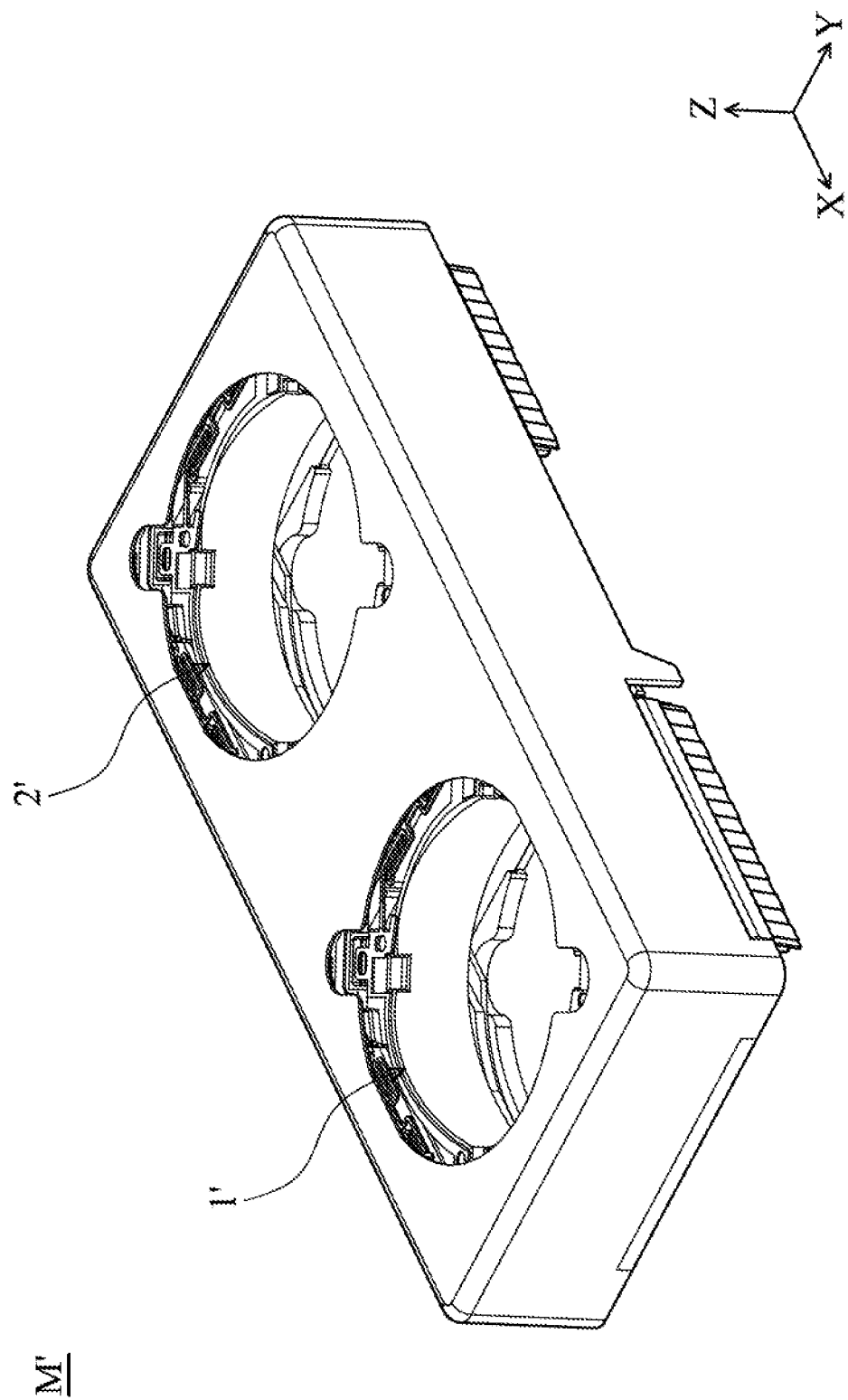
FIG. 8 shows a perspective diagram of a camera module M', in accordance with another embodiment of the invention.
Figure 9:
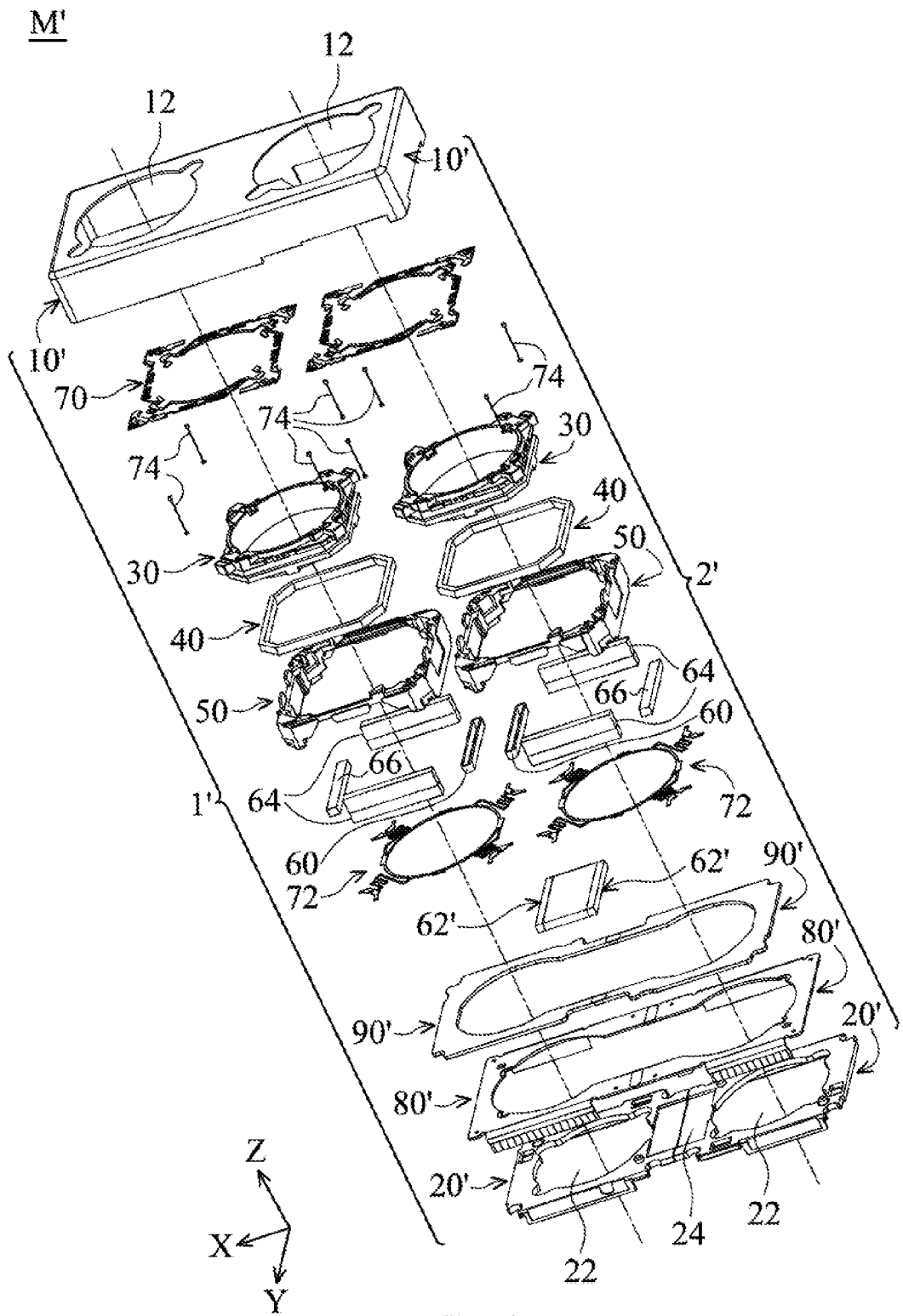
FIG. 9 shows an exploded diagram of the camera module M' in FIG. 8.

FIG. 8 shows a camera module M' according to another embodiment of the invention, and FIG. 9 shows an exploded diagram of the camera module M' in FIG. 8. Referring to FIGS. 8 and 9, the camera module M' includes two image capturing units 1' and 2', which are different from the image capturing units 1 and 2 in that their housings 1', bases 20', first magnets 62', circuit boards 80', and driving boards 90' are integrally formed in one piece.

In this embodiment, the two first magnets 62' corresponding to the image capturing units 1' and 2' may be integrally formed in one piece as a 6-pole magnet. The two bases 20' corresponding to the image capturing units 1' and 2' may also be integrally formed in one piece as a single component which forms a cavity 24 for receiving the first magnets 62'. Thus, efficient and easy assembly, low production cost, and miniaturization of the camera module M' can be achieved.

Figure 10:
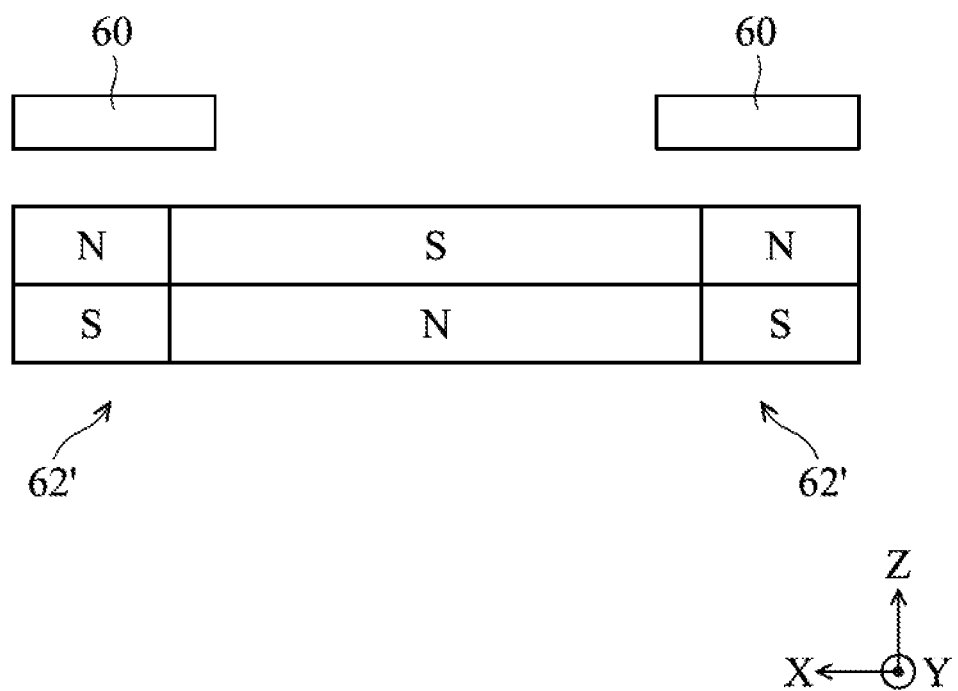
FIG. 10 shows a perspective diagram of the 6-pole magnet and the first coils in FIG. 9.

As shown in FIG. 10, the first magnets 62' in the image capturing units 1' and 2' can be integrally formed in one piece as a 6-pole magnet, corresponding to the two first coils 60, so that magnetic interference between different magnets can be prevented. It should be noted that when the first coils 60 are energized by electrical current, two magnetic forces can be produced between the 6-pole magnet and the first coils 60, respectively, so that the frames 50, the lens holders 30 and the lenses can move relative to the base 20' in a horizontal direction, and optical image stabilization (OIS) of the camera module without magnetic interference between the image capturing units 1' and 2' can therefore be achieved.

In summary, the invention provides a camera nodule including at least one image capturing unit having at least a first magnet disposed on a fixed base, and correspondingly, a first coil is disposed on a frame which is movable relative to the base, so that magnetic interference between the first magnet and other magnetic component can be efficiently reduced. In some embodiments, the camera may include another image capturing unit (camera unit), wherein the first magnet is disposed on the base, the first coil is disposed on the frame which is movable relative to the base, and first magnet and the first coil are disposed on a side of the image capturing unit which is adjacent to the other image capturing unit (camera unit), so as to prevent magnetic interference between the two image capturing units and facilitate miniaturization of the camera module.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capturing unit, comprising:
   a base;
   a frame, movably connected to the base;
   a lens holder, movably disposed in the frame for receiving a lens;
   a first magnet, disposed on the base;
   a first coil, disposed on the frame, wherein when a first current is applied to the first coil, a first magnetic force is generated between the first magnet and the first coil to move the frame and the lens holder relative to the base;
   a second magnet, disposed on the frame; and
   a second coil, disposed on the lens holder, wherein when a second current is applied to the second coil, a second magnetic force is generated between the second magnet and the second coil to move the lens holder relative to the frame.

2. The image capturing unit as claimed in claim 1, wherein when the first current is applied to the first coil, the frame and the lens holder moves relative to the base along a first direction perpendicular to an optical axis of the lens.

3. The image capturing unit as claimed in claim 2, wherein when the second current is applied to the second coil, the lens holder moves relative to the frame along a second direction perpendicular to the first direction.

4. The image capturing unit as claimed in claim 1, further comprising a third magnet disposed on the frame and a third coil disposed on the base, wherein when a third current is applied to the third coil, a third magnetic force is generated between the third magnet and the third coil to move the frame and the lens holder relative to the base.

5. The image capturing unit as claimed in claim 4, wherein the first coil and the third magnet respectively have a bottom surface corresponding to the first magnet and the third coil, and the bottom surfaces of the first coil and the third magnet are aligned with each other.

6. The image capturing unit as claimed in claim 4, wherein the first magnet and the third coil respectively have a top surface corresponding to the first coil and the third magnet, and the top surfaces of the first magnet and the third coil are aligned with each other.

7. The image capturing unit as claimed in claim 4, further comprising a driving board with the third coil affixed thereto, wherein the driving board has a C-shaped structure, and the first magnet is located at an opening of the C-shaped structure.

8. The image capturing unit as claimed in claim 1, further comprising a third magnet disposed on the base and a third coil disposed on the frame, wherein when a third current is applied to the third coil, a third magnetic force is generated between the third magnet and the third coil to move the frame and the lens holder relative to the base.

9. The image capturing unit as claimed in claim 1, wherein when viewed along a direction perpendicular to an optical axis of the lens, the first coil and the second magnet at least partially overlap.

10. The image capturing unit as claimed in claim 1, wherein at least one of the first and second magnets is a multi-polar magnet.

11. A camera module, including two image capturing units as claimed in claim 1, wherein the first magnets and the first coils of the two image capturing units are disposed on two adjacent sides between the two image capturing units.

12. The camera module as claimed in claim 11, wherein the first magnets of the two image capturing units are integrally formed in one piece.

13. The camera module as claimed in claim 12, wherein the first magnets of the two image capturing units are integrally formed in one piece as a 6-pole magnet.

14. The camera module as claimed in claim 11, wherein the bases of the two image capturing units are integrally formed in one piece.

15. A camera module, including the image capturing unit as claimed in claim 1 and a camera unit arranged along a longitudinal direction, wherein the first magnet and the first coil are disposed on a side of the image capturing unit which is adjacent to the camera unit.

16. The camera module as claimed in claim 15, wherein when the first current is applied to the first coil, the frame and the lens holder moves relative to the base along a first direction perpendicular to an optical axis of the lens.

17. The camera module as claimed in claim 16, wherein when the second current is applied to the second coil, the lens holder moves relative to the frame along a second direction perpendicular to the first direction.

18. The camera module as claimed in claim 15, further comprising a third magnet disposed on the frame and a third coil disposed on the base, wherein when a third current is applied to the third coil, a third magnetic force is generated between the third magnet and the third coil to move the frame and the lens holder relative to the base.

19. The camera module as claimed in claim 18, further comprising a driving board with the third coil affixed thereto, wherein the driving board has a C-shaped structure, and the first magnet is located at an opening of the C-shaped structure.

20. The camera module as claimed in claim 15, further comprising a third magnet disposed on the base and a third coil disposed on the frame, wherein when a third current is applied to the third coil, a third magnetic force is generated between the third magnet and the third coil to move the frame and the lens holder relative to the base.

* * * * *